(12) United States Patent
Marecki et al.

(10) Patent No.: US 12,458,349 B2
(45) Date of Patent: Nov. 4, 2025

(54) BLADE ASSEMBLY FOR A SURGICAL RELOADABLE CARTRIDGE ASSEMBLY

(71) Applicant: Lexington Medical, Inc., Bedford, MA (US)

(72) Inventors: Andrew Marecki, West Boylston, MA (US); Richard Moyer, Allston, MA (US); Leon Amariglio, Lexington, MA (US)

(73) Assignee: Lexington Medical, Inc., Bedford, MA (US)

( * ) Notice: Subject to any disclaimer, the term of this patent is extended or adjusted under 35 U.S.C. 154(b) by 0 days.

(21) Appl. No.: 17/669,683

(22) Filed: Feb. 11, 2022

(65) Prior Publication Data

US 2023/0255626 A1 Aug. 17, 2023

(51) Int. Cl.
*A61B 17/072* (2006.01)
*A61B 17/068* (2006.01)

(52) U.S. Cl.
CPC ........ *A61B 17/072* (2013.01); *A61B 17/0686* (2013.01); *A61B 2017/07257* (2013.01); *A61B 2017/07271* (2013.01); *A61B 2017/07285* (2013.01)

(58) Field of Classification Search
CPC ............................................ A61B 2017/07285
USPC ....................................................... 227/180.1
See application file for complete search history.

(56) References Cited

U.S. PATENT DOCUMENTS

| | | |
|---|---|---|
| 3,142,187 A | 7/1964 | Hugh et al. |
| 3,517,570 A | 6/1970 | Kolb |
| 3,919,506 A | 11/1975 | Kellogg |
| RE28,932 E | 8/1976 | Noiles et al. |
| 4,175,220 A | 11/1979 | Johnston et al. |
| 4,737,608 A | 4/1988 | Jones |
| 4,754,909 A | 7/1988 | Barker et al. |
| 4,884,478 A | 12/1989 | Lieser |
| 4,978,049 A | 12/1990 | Green |
| 5,300,081 A | 4/1994 | Young et al. |
| 5,322,161 A | 6/1994 | Shichman et al. |

(Continued)

FOREIGN PATENT DOCUMENTS

| | | |
|---|---|---|
| CN | 1985768 B | 9/2011 |
| CN | 101194853 B | 7/2012 |

(Continued)

OTHER PUBLICATIONS

Final Office Action received in U.S. Appl. No. 15/631,429 dated Jan. 10, 2020, 17 pages.

(Continued)

*Primary Examiner* — Thanh K Truong
*Assistant Examiner* — Patrick B Fry
(74) *Attorney, Agent, or Firm* — Dorsey & Whitney LLP

(57) ABSTRACT

The present disclosure includes apparatuses for a surgical reloadable cartridge assembly. An example apparatus includes a blade assembly which comprises leaves and an I-beam. In an example there are two outer leaves and at least one inner leaf. The two outer leaves are connected to the I-beam. The at least one inner leaf is not connected to the outer leaves and is connected to the I-beam with a connection that allows the at least one inner leaf to move relative to the I-beam while not being pulled away from the I-beam when tension is applied to the at least one inner leaf.

21 Claims, 5 Drawing Sheets

(56) References Cited

U.S. PATENT DOCUMENTS

| | | |
|---|---|---|
| 5,325,987 A | 7/1994 | Alpern et al. |
| 5,326,013 A | 7/1994 | Green et al. |
| RE34,680 E | 8/1994 | Lieser |
| 5,379,895 A | 1/1995 | Foslien |
| 5,453,094 A | 9/1995 | Metcalf et al. |
| 5,474,223 A | 12/1995 | Viola et al. |
| 5,489,058 A | 2/1996 | Plyley et al. |
| 5,489,292 A | 2/1996 | Tovey et al. |
| 5,507,426 A | 4/1996 | Young et al. |
| 5,522,534 A | 6/1996 | Mola et al. |
| 5,535,935 A | 7/1996 | Vidal et al. |
| 5,586,711 A | 12/1996 | Plyley et al. |
| 5,588,579 A | 12/1996 | Schnut et al. |
| 5,601,224 A | 2/1997 | Bishop et al. |
| 5,632,432 A | 5/1997 | Schulze et al. |
| 5,651,491 A | 7/1997 | Heaton et al. |
| 5,702,408 A | 12/1997 | Wales et al. |
| 5,713,505 A | 2/1998 | Huitema |
| 5,743,350 A | 4/1998 | Yamawaki et al. |
| 5,752,590 A | 5/1998 | Lin |
| 5,758,814 A | 6/1998 | Gallagher et al. |
| 5,762,256 A | 6/1998 | Mastri et al. |
| 5,799,857 A | 9/1998 | Robertson et al. |
| 5,823,066 A | 10/1998 | Huitema |
| 5,836,503 A | 11/1998 | Ehrenfels et al. |
| 5,862,715 A | 1/1999 | Lemire |
| 5,865,361 A | 2/1999 | Milliman et al. |
| 5,901,895 A | 5/1999 | Heaton et al. |
| 6,109,500 A | 8/2000 | Alli et al. |
| 6,281,453 B1 | 8/2001 | Uleski |
| 6,302,798 B1 | 10/2001 | Nakaguro |
| 6,945,444 B2 | 9/2005 | Gresham et al. |
| 6,957,758 B2 | 10/2005 | Aranyi |
| 6,981,628 B2 | 1/2006 | Wales |
| 7,044,352 B2 | 5/2006 | Shelton, IV et al. |
| 7,044,353 B2 | 5/2006 | Mastri et al. |
| 7,097,089 B2 | 8/2006 | Marczyk |
| 7,143,923 B2 | 12/2006 | Shelton, IV et al. |
| 7,143,924 B2 | 12/2006 | Scirica et al. |
| 7,168,604 B2 | 1/2007 | Milliman et al. |
| 7,225,963 B2 | 6/2007 | Scirica |
| 7,234,624 B2 | 6/2007 | Gresham et al. |
| 7,303,106 B2 | 12/2007 | Milliman et al. |
| 7,325,713 B2 | 2/2008 | Aranyi |
| 7,364,060 B2 | 4/2008 | Milliman |
| 7,380,695 B2 | 6/2008 | Doll et al. |
| 7,380,696 B2 | 6/2008 | Shelton, IV et al. |
| 7,398,907 B2 | 7/2008 | Racenet et al. |
| 7,404,508 B2 | 7/2008 | Smith et al. |
| 7,422,136 B1 | 9/2008 | Marczyk |
| 7,431,188 B1 | 10/2008 | Marczyk |
| 7,455,208 B2 | 11/2008 | Wales et al. |
| 7,490,749 B2 | 2/2009 | Schall et al. |
| 7,494,038 B2 | 2/2009 | Milliman |
| 7,516,877 B2 | 4/2009 | Aranyi |
| 7,546,940 B2 | 6/2009 | Milliman et al. |
| 7,611,038 B2 | 11/2009 | Racenet et al. |
| 7,624,902 B2 | 12/2009 | Marczyk et al. |
| 7,657,974 B2 | 2/2010 | Huang |
| 7,694,865 B2 | 4/2010 | Scirica |
| 7,703,653 B2 | 4/2010 | Shah et al. |
| 7,780,055 B2 | 8/2010 | Scirica et al. |
| 7,802,712 B2 | 9/2010 | Milliman et al. |
| 7,824,426 B2 | 11/2010 | Racenet et al. |
| 7,832,408 B2 | 11/2010 | Shelton, IV et al. |
| 7,837,079 B2 | 11/2010 | Holsten et al. |
| 7,845,535 B2 | 12/2010 | Scircia |
| 7,857,187 B2 | 12/2010 | Milliman |
| 7,870,810 B2 | 1/2011 | Da et al. |
| 7,900,805 B2 | 3/2011 | Shelton et al. |
| 7,926,692 B2 | 4/2011 | Racenet et al. |
| 7,963,431 B2 | 6/2011 | Scirica |
| 7,967,178 B2 | 6/2011 | Scirica et al. |
| 7,967,180 B2 | 6/2011 | Scirica |
| 7,988,028 B2 * | 8/2011 | Farascioni ........... A61B 17/068 227/176.1 |
| 8,020,743 B2 | 9/2011 | Shelton, IV |
| 8,056,789 B1 | 11/2011 | White et al. |
| 8,061,576 B2 | 11/2011 | Cappola |
| 8,070,036 B1 | 12/2011 | Knodel |
| 8,123,101 B2 | 2/2012 | Racenet et al. |
| 8,136,712 B2 | 3/2012 | Zingman |
| 8,141,763 B2 | 3/2012 | Milliman |
| 8,157,148 B2 | 4/2012 | Scirica |
| 8,235,274 B2 | 8/2012 | Cappola |
| 8,292,157 B2 | 10/2012 | Smith et al. |
| 8,292,905 B2 | 10/2012 | Taylor et al. |
| 8,328,822 B2 | 12/2012 | Huitema et al. |
| 8,336,751 B2 | 12/2012 | Scirica |
| 8,336,754 B2 | 12/2012 | Cappola et al. |
| 8,342,378 B2 | 1/2013 | Marczyk |
| 8,360,296 B2 | 1/2013 | Zingman |
| 8,413,868 B2 | 4/2013 | Cappola |
| 8,424,736 B2 | 4/2013 | Scirica et al. |
| 8,573,460 B2 | 11/2013 | Cappola |
| 8,573,463 B2 | 11/2013 | Scirica |
| 8,584,919 B2 | 11/2013 | Hueil et al. |
| 8,608,043 B2 | 12/2013 | Scirica |
| 8,622,894 B2 | 1/2014 | Banik et al. |
| 8,632,535 B2 | 1/2014 | Shelton et al. |
| 8,684,247 B2 | 4/2014 | Scirica et al. |
| 8,684,249 B2 | 4/2014 | Racenet et al. |
| 8,695,865 B2 | 4/2014 | Smith et al. |
| 8,888,814 B2 | 11/2014 | Cappola |
| 8,910,847 B2 | 12/2014 | Nalagatla et al. |
| 9,060,770 B2 * | 6/2015 | Shelton, IV ..... A61B 17/07207 |
| 9,072,523 B2 | 7/2015 | Houser et al. |
| 9,089,338 B2 | 7/2015 | Smith et al. |
| 9,204,876 B2 | 12/2015 | Cappola et al. |
| 9,241,715 B2 | 1/2016 | Kasvikis et al. |
| 9,268,356 B2 | 2/2016 | Burleson |
| 9,282,966 B2 * | 3/2016 | Shelton, IV ......... A61B 17/064 |
| 9,346,223 B2 | 5/2016 | Payne |
| 9,364,218 B2 | 6/2016 | Scirica |
| 9,393,016 B2 | 7/2016 | Scirica et al. |
| 9,463,022 B2 | 10/2016 | Swayze et al. |
| 9,539,006 B2 | 1/2017 | Collings et al. |
| 9,655,617 B2 | 5/2017 | Cappola |
| 9,679,716 B2 | 6/2017 | Faurie et al. |
| 9,844,378 B2 | 12/2017 | Casasanta et al. |
| 9,855,040 B2 | 1/2018 | Kostrzewski |
| 9,861,358 B2 | 1/2018 | Marczyk et al. |
| 9,931,739 B2 | 4/2018 | Nelson |
| 10,039,546 B2 | 8/2018 | Williams et al. |
| 10,383,634 B2 | 8/2019 | Shelton, IV |
| 10,413,291 B2 * | 9/2019 | Worthington .......... A61B 17/32 |
| 10,668,600 B1 | 6/2020 | Ye et al. |
| 10,849,621 B2 | 12/2020 | Whitfield et al. |
| 10,905,422 B2 * | 2/2021 | Bakos .............. A61B 17/07207 |
| 10,912,560 B2 * | 2/2021 | Marecki ................ A61B 17/068 |
| 11,116,501 B1 | 9/2021 | Marecki |
| 11,185,326 B2 * | 11/2021 | Kostrzewski ........ A61B 17/072 |
| 11,298,131 B2 | 4/2022 | Marecki et al. |
| 11,376,003 B2 | 7/2022 | Somekh et al. |
| 11,510,668 B2 * | 11/2022 | Racenet ................ A61B 17/105 |
| 11,617,582 B2 | 4/2023 | Marecki et al. |
| 11,771,424 B2 | 10/2023 | Marecki |
| 11,844,523 B2 | 12/2023 | Marecki et al. |
| 2001/0030219 A1 | 10/2001 | Green et al. |
| 2004/0232199 A1 | 11/2004 | Shelton et al. |
| 2005/0006429 A1 | 1/2005 | Wales |
| 2005/0116009 A1 | 6/2005 | Milliman |
| 2005/0139635 A1 | 6/2005 | Wukusick et al. |
| 2006/0079912 A1 | 4/2006 | Whitfield et al. |
| 2006/0111210 A1 | 5/2006 | Hinman |
| 2007/0125826 A1 | 6/2007 | Shelton, IV |
| 2007/0262116 A1 | 11/2007 | Hueil et al. |
| 2008/0017693 A1 | 1/2008 | Mastri et al. |
| 2008/0083810 A1 | 4/2008 | Marczyk |
| 2008/0179374 A1 | 7/2008 | Beardsley et al. |
| 2008/0179375 A1 | 7/2008 | Scirica |
| 2008/0308607 A1 | 12/2008 | Timm et al. |
| 2009/0062614 A1 | 3/2009 | Adzich et al. |

(56) References Cited

U.S. PATENT DOCUMENTS

| | | |
|---|---|---|
| 2009/0145947 A1 | 6/2009 | Scirica et al. |
| 2009/0206137 A1 | 8/2009 | Hall et al. |
| 2009/0272614 A1 | 11/2009 | Wataral |
| 2010/0001036 A1 | 1/2010 | Marczyk et al. |
| 2010/0193568 A1 | 8/2010 | Scheib et al. |
| 2010/0264193 A1 | 10/2010 | Huang et al. |
| 2011/0062211 A1 | 3/2011 | Ross |
| 2011/0253765 A1 | 10/2011 | Nicholas |
| 2011/0290854 A1 | 12/2011 | Timm et al. |
| 2011/0295242 A1 | 12/2011 | Spivey et al. |
| 2012/0053406 A1 | 3/2012 | Conlon et al. |
| 2012/0111591 A1 | 5/2012 | Shelton et al. |
| 2012/0138659 A1 | 6/2012 | Marczyk et al. |
| 2012/0168484 A1 | 7/2012 | Scirica et al. |
| 2012/0271284 A1 | 10/2012 | Cappola |
| 2012/0286019 A1 | 11/2012 | Hueil |
| 2013/0092719 A1 | 4/2013 | Kostrzewski |
| 2013/0098965 A1 | 4/2013 | Kostrzewski et al. |
| 2013/0098966 A1 | 4/2013 | Kostrzewski et al. |
| 2013/0098968 A1 | 4/2013 | Aranyi et al. |
| 2013/0199327 A1 | 8/2013 | Park et al. |
| 2013/0245676 A1 | 9/2013 | Cappola |
| 2013/0304115 A1 | 11/2013 | Miyamoto |
| 2014/0224856 A1 | 8/2014 | Smith et al. |
| 2014/0276949 A1 | 9/2014 | Staunton et al. |
| 2014/0361068 A1 | 12/2014 | Aranyi et al. |
| 2015/0047451 A1 | 2/2015 | Kwon |
| 2015/0083738 A1 | 3/2015 | Kasvikis et al. |
| 2015/0196996 A1 | 7/2015 | Nelson |
| 2015/0342605 A1 | 12/2015 | Abbott et al. |
| 2015/0374396 A1 | 12/2015 | Strobl |
| 2016/0058441 A1 | 3/2016 | Morgan et al. |
| 2016/0166250 A1 | 6/2016 | Marczyk |
| 2016/0270781 A1 | 9/2016 | Scirica |
| 2016/0270786 A1 | 9/2016 | Scirica |
| 2017/0000485 A1 | 1/2017 | Shelton, IV et al. |
| 2017/0172577 A1 | 6/2017 | Wenchell et al. |
| 2017/0281177 A1 | 10/2017 | Harris et al. |
| 2017/0281184 A1 | 10/2017 | Shelton, IV |
| 2017/0281220 A1 | 10/2017 | Hibner |
| 2018/0078354 A1 | 3/2018 | Cardinale et al. |
| 2018/0168599 A1 | 6/2018 | Bakos |
| 2018/0289370 A1 | 10/2018 | Amariglio et al. |
| 2018/0310935 A1 | 11/2018 | Wixey |
| 2018/0317915 A1 | 11/2018 | McDonald, II |
| 2018/0368832 A1 | 12/2018 | Marecki et al. |
| 2019/0099182 A1* | 4/2019 | Bakos ............ A61B 17/0682 |
| 2020/0008801 A1 | 1/2020 | Somekh et al. |
| 2020/0015818 A1 | 1/2020 | Amariglio et al. |
| 2020/0093486 A1 | 3/2020 | Somekh et al. |
| 2020/0222046 A1 | 7/2020 | Somekh et al. |
| 2021/0007740 A1 | 1/2021 | Marecki et al. |
| 2021/0212682 A1 | 7/2021 | Marecki et al. |
| 2021/0346016 A1 | 11/2021 | Marecki |
| 2022/0133314 A1* | 5/2022 | Li .................... A61B 17/072 |
| | | 227/180.1 |
| 2022/0183689 A1 | 6/2022 | Marecki et al. |
| 2023/0233206 A1 | 7/2023 | Marecki et al. |
| 2024/0023959 A1 | 1/2024 | Marecki |
| 2024/0115260 A1 | 4/2024 | Marecki et al. |

FOREIGN PATENT DOCUMENTS

| | | |
|---|---|---|
| CN | 101965156 B | 12/2012 |
| CN | 104640510 A | 5/2015 |
| CN | 108556696 B | 4/2024 |
| EP | 1563791 | 8/2005 |
| EP | 1563792 | 8/2005 |
| EP | 1563794 | 8/2005 |
| EP | 1709911 | 10/2006 |
| EP | 1021130 | 11/2006 |
| EP | 1908410 A1 | 4/2008 |
| EP | 2253277 | 11/2010 |
| EP | 2253278 | 11/2010 |
| EP | 1536792 B1 | 9/2013 |
| EP | 2586382 A3 | 9/2013 |
| EP | 2662033 A1 | 11/2013 |
| EP | 2073718 B1 | 8/2014 |
| EP | 2777530 A1 | 9/2014 |
| EP | 2886020 | 6/2015 |
| EP | 2886071 A1 | 6/2015 |
| EP | 2484290 | 7/2015 |
| EP | 2311385 | 5/2017 |
| EP | 2807982 B1 | 8/2017 |
| EP | 3222221 A1 | 9/2017 |
| WO | 2016107586 A1 | 7/2016 |

OTHER PUBLICATIONS

Final Office Action received in U.S. Appl. No. 16/027,579 dated Dec. 11, 2020, 19 pages.

Final Office Action received in U.S. Appl. No. 16/027,579 dated Dec. 20, 2021, 20 pages.

Final Office Action received in U.S. Appl. No. 17/033,210 dated Aug. 25, 2022, 12 pages.

Final Office Action received in U.S. Appl. No. 18/129,284 dated Aug. 7, 2024, 8 pages.

Final Office Action received in U.S. Appl. No. 18/129,294 dated Aug. 7, 2024, 8 pages.

International Search Report and Written Opinion dated Apr. 7, 2020 for PCT Application No. PCT/US2020/013694 filed Jan. 15, 2020, 8 pages.

International Search Report and Written Opinion dated Jun. 18, 2018 for PCT Application No. PCT/US2018/025988 filed Apr. 4, 2018, 8 pages.

International Search Report and Written Opinion dated Oct. 22, 2018 for PCT Application No. PCT/ US2018/038909 filed Jun. 22, 2018, 10 pages.

International Search Report and Written Opinion dated Oct. 4, 2019 for PCT Application No. PCT/US2019/040315 filed Jul. 2, 2018, 9 pages.

International Search Report and Written Opinion received in PCT Application No. PCT/US21/13226 dated Mar. 26, 2021, 8 pages.

International Search Report and Written Opinion received in PCT Application No. PCT/US21/25899 dated Jun. 28, 2021, 6 pages.

International Search Report and Written Opinion received in PCT Application No. PCT/US23/12664 dated Mar. 15, 2023, 9 pages.

Non Final Office Action received in U.S. Appl. No. 16/027,579 dated Jul. 22, 2021, 17 pages.

Non Final Office Action received in U.S. Appl. No. 16/027,579 dated Jun. 12, 2020, 16 pages.

Non Final Office Action received in U.S. Appl. No. 16/743,317 dated Aug. 20, 2021, 12 pages.

Non Final Office Action received in U.S. Appl. No. 17/033,210 dated Mar. 4, 2022, 15 pages.

Non Final Office Action received in U.S. Appl. No. 17/382,657 dated Jan. 31, 2023, 11 pages.

Non Final Office Action received in U.S. Appl. No. 18/129,284 dated May 1, 2024, 13 pages.

Non Final Office Action received in U.S. Appl. No. 18/129,294 dated May 1, 2024, 13 pages.

Non Final Office Action received in U.S. Appl. No. 18/479,593 dated Aug. 6, 2024, 12 pages.

Non-Final Office Action received in U.S. Appl. No. 15/631,429 dated Aug. 29, 2019, 16 pages.

Notice of Allowance received in U.S. Appl. No. 15/631,429 dated Oct. 29, 2020, 9 pages.

Notice of Allowance received in U.S. Appl. No. 16/027,579 dated Mar. 14, 2022, 8 pages.

Notice of Allowance received in U.S. Appl. No. 16/743,317 dated Dec. 17, 2021, 8 pages.

Notice of Allowance received in U.S. Appl. No. 16/845,217 dated Jun. 9, 2021, 8 pages.

Notice of Allowance received in U.S. Appl. No. 17/033,210 dated Mar. 8, 2023, 8 pages.

Notice of Allowance received in U.S. Appl. No. 17/382,657 dated May 23, 2023, 7 pages.

(56) References Cited

OTHER PUBLICATIONS

Notice of Allowance received in U.S. Appl. No. 17/689,549 dated Jul. 31, 2023, 11 pages.
Restriction Requirement mailed in U.S. Appl. No. 15/631,429 dated Jul. 29, 2019, 6 pages.
Restriction Requirement received in U.S. Appl. No. 16/027,579 dated Mar. 16, 2020, 6 pages.
Non-Final Office Action received in U.S. Appl. No. 18/543,682 dated Dec. 9, 2024, pp. all.
Notice of Allowance received in U.S. Appl. No. 18/129,284 dated Jan. 22, 2025, pp all.
Notice of Allowance received in U.S. Appl. No. 18/479,593 dated Feb. 20, 2025, 33 pages.
Notice of Allowance received in U.S. Appl. No. 18/543,682 dated Mar. 11, 2025, 12 pages.

* cited by examiner

BLADE ASSEMBLY FOR A SURGICAL RELOADABLE CARTRIDGE ASSEMBLY

TECHNICAL FIELD

The present disclosure relates generally to a surgical reloadable cartridge assembly, and more particularly, to a blade assembly for a surgical reloadable cartridge assembly.

BACKGROUND

A surgical reloadable cartridge assembly can be used in a number of surgical devices. One example includes use as a surgical stapler. A surgical stapler is a fastening device used to clamp tissue between opposing jaw structures to join tissue using surgical fasteners. Surgical staplers can include two elongated members used to clamp the tissue. One of the elongated members can include one or more staple cartridges and the other elongated member can include an anvil that can be used to form a staple when driven from the staple cartridge. An example of a staple cartridge assembly can include having rows of staples having a linear length. For example, a row of staples can have a linear length between 30 mm and 60 mm. The surgical stapler can include a surgical handle assembly connected to the surgical reloadable cartridge assembly. A staple can be ejected by actuation of a movable handle member that is a part of the surgical handle assembly of the surgical stapler.

A surgical stapler can receive one or more surgical reloadable cartridge assemblies. An example of a surgical reloadable cartridge assembly can include an articulation arm and a blade assembly. The articulation arm can facilitate access to tissue by pivoting the jaw structures. The blade assembly can facilitate clamping of the tissue when the movable handle member is actuated. The blade assembly can also actuate the ejection of staples when the movable handle member is actuated.

The blade assembly included in the surgical reloadable cartridge assembly can form an incision in tissue. For example, the blade assembly can longitudinally cut and/or open stapled tissue. An example of a surgical reloadable cartridge assembly can include a blade assembly that cuts tissue between rows of staples.

DETAILED DESCRIPTION

Figure 1:
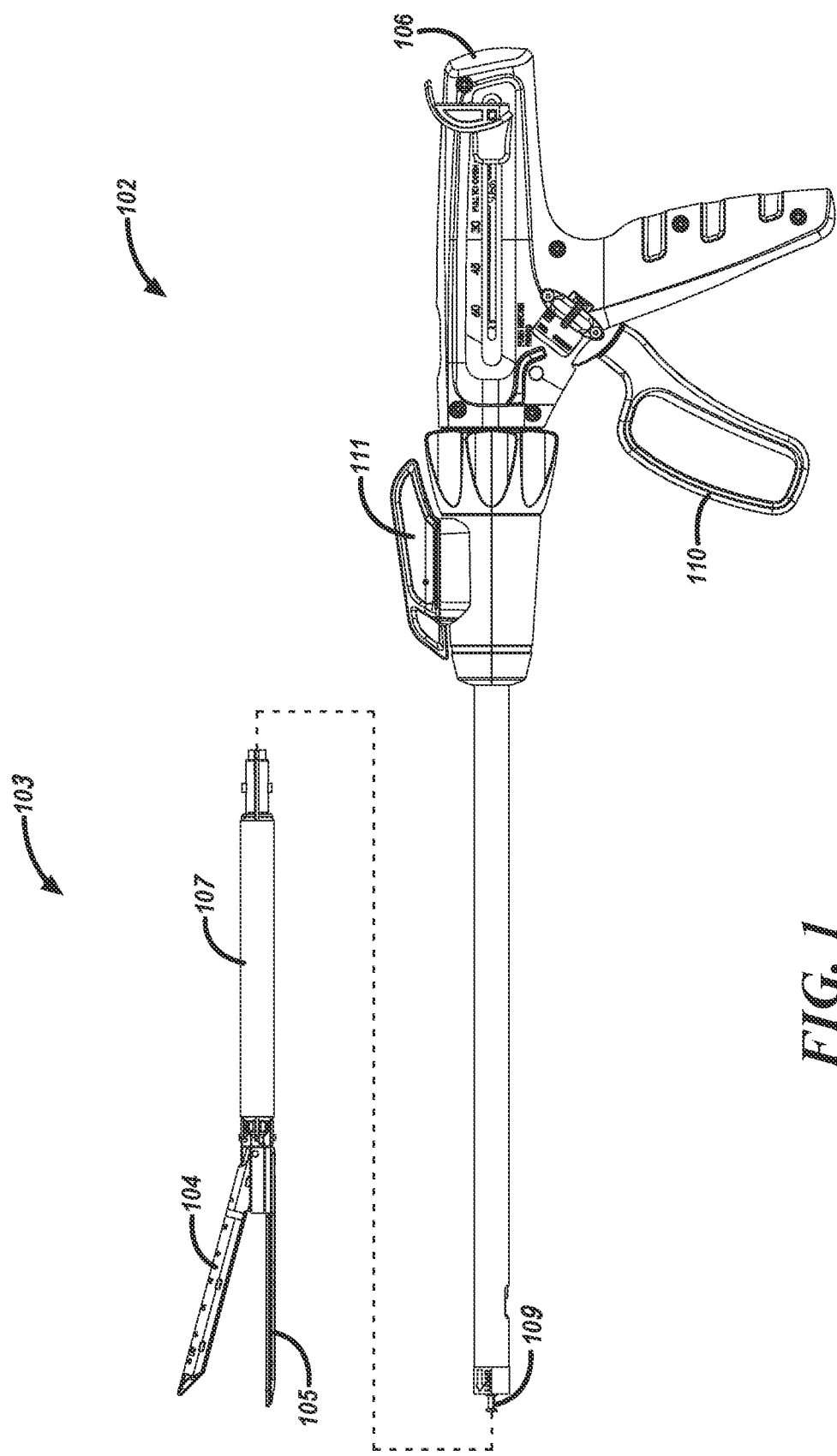
FIG. 1 is a schematic diagram of a surgical stapling apparatus including a surgical reloadable cartridge assembly in accordance with a number of embodiments of the present disclosure.

The present disclosure includes apparatuses for a surgical reloadable cartridge assembly. An example apparatus includes a blade assembly comprising an I-beam and a number of leaves. The outer leaves are welded or secured to the I-beam and the inner leaf or leaves are mechanically coupled to the I-beam.

In a number of embodiments, the one or more inner leaves are mechanically coupled to the I-beam through a mechanical or physical interlock or interface fit. As a result, the proximal end of the one or more inner leaves can be moved out of alignment with the longitudinal axis of the blade assembly. This movement imparts greater flexibility to the blade assembly as compared to a blade assembly where all the leaves are welded or secured to the I-beam.

In a number of embodiments, a surgical reloadable cartridge assembly may comprise an articulation arm, a sleeve, and a cover. The articulation arm can actuate a first elongated member and/or a second elongated member of the surgical reloadable cartridge assembly. For example, the articulation arm can be used to actuate the surgical reloadable cartridge assembly to access tissue.

In a number of embodiments, a surgical stapler can include the surgical reloadable cartridge assembly. When actuated by a handle component of the surgical stapler, the blade assembly will be moved distally and the I-beam will cause staples to be delivered and the stapled tissue to be cut. Many surgical staplers have articulation assemblies that move the jaw assembly of the reloadable cartridge assembly into and out of alignment with the longitudinal axis of the surgical stapler. A more flexible blade assembly can be easier to articulate than a stiffer blade assembly.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is to be understood that the terminology used herein is for the purpose of describing particular embodiments only and is not intended to be limiting. As used herein, the singular forms "a", "an", and "the" can include both singular and plural referents, unless the context clearly dictates otherwise. In addition, "a number of", "at least one", and "one or more" (e.g., a number of staples) can refer to one or more staples, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically or for access to and movement of the movable handle member, as appropriate to the context.

The figures herein follow a numbering convention in which the first digit or digits correspond to the figure number and the remaining digits identify an element or component in the figure. Similar elements or components between different figures may be identified by the use of similar digits. For example, 103 may reference element "3" in FIG. 1, and a similar element may be referenced as 203 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a schematic diagram of a surgical stapling apparatus 102 including a surgical reloadable cartridge assembly 103 in accordance with a number of embodiments of the present disclosure. In the example, a surgical stapling apparatus 102 can include a surgical reloadable cartridge assembly 103 (e.g., a disposable loading unit) and a surgical handle assembly 106. The surgical reloadable cartridge assembly 103 can be releasably secured to a distal end of an elongated body of the surgical handle assembly 106. The surgical handle assembly 106 can include a drive shaft 109 that can be coupled to a blade assembly (e.g., blade assembly 216 in FIG. 2) included in the surgical reloadable cartridge assembly 103.

In this example, the surgical reloadable cartridge assembly 103 can include a shaft 107 coupled to a first elongated member 104 and a second elongated member 105. The blade assembly can be positioned within the shaft 107. The first elongated member 104 and the second elongated member 105 can be used to clamp tissue. One of the elongated members can house one or more staple cartridges (e.g., a staple cartridge). The other elongated member can have an anvil that can be used to form a staple when driven from the staple cartridge.

Surgical stapling apparatus 102 can receive reloadable cartridges and/or surgical reloadable cartridge assemblies having rows of staples. In a number of embodiments, third party surgical reloadable cartridges and/or surgical reloadable cartridge assemblies may be used with the surgical handle assembly 106 and embodiments of surgical handle assembly 106 may be configured to receive the same. A staple can be ejected by actuation of a movable handle member 110 that is a part of the surgical handle assembly 106 of the surgical stapling apparatus 102. Actuation of the movable handle member 110 can actuate the blade assembly to eject a number of staples and cut tissue. Further, embodiments are not limited to use with a surgical stapling apparatus 102. The surgical handle assembly 106 is described with the surgical stapling apparatus 102 example throughout the present disclosure for ease of understanding and illustration.

The surgical reloadable cartridge assembly 103 can be actuated using a knob 111 to reach a stapling site and position the surgical reloadable cartridge assembly 103 at a particular angle for stapling. The knob 111 can be configured to actuate rotationally at least a portion of the surgical reloadable cartridge assembly 103 (e.g., elongated members 104 and 105) such that the portion can rotate about an axis of a particular plane in response to the knob 111 being actuated rotationally by a user.

Figure 2:
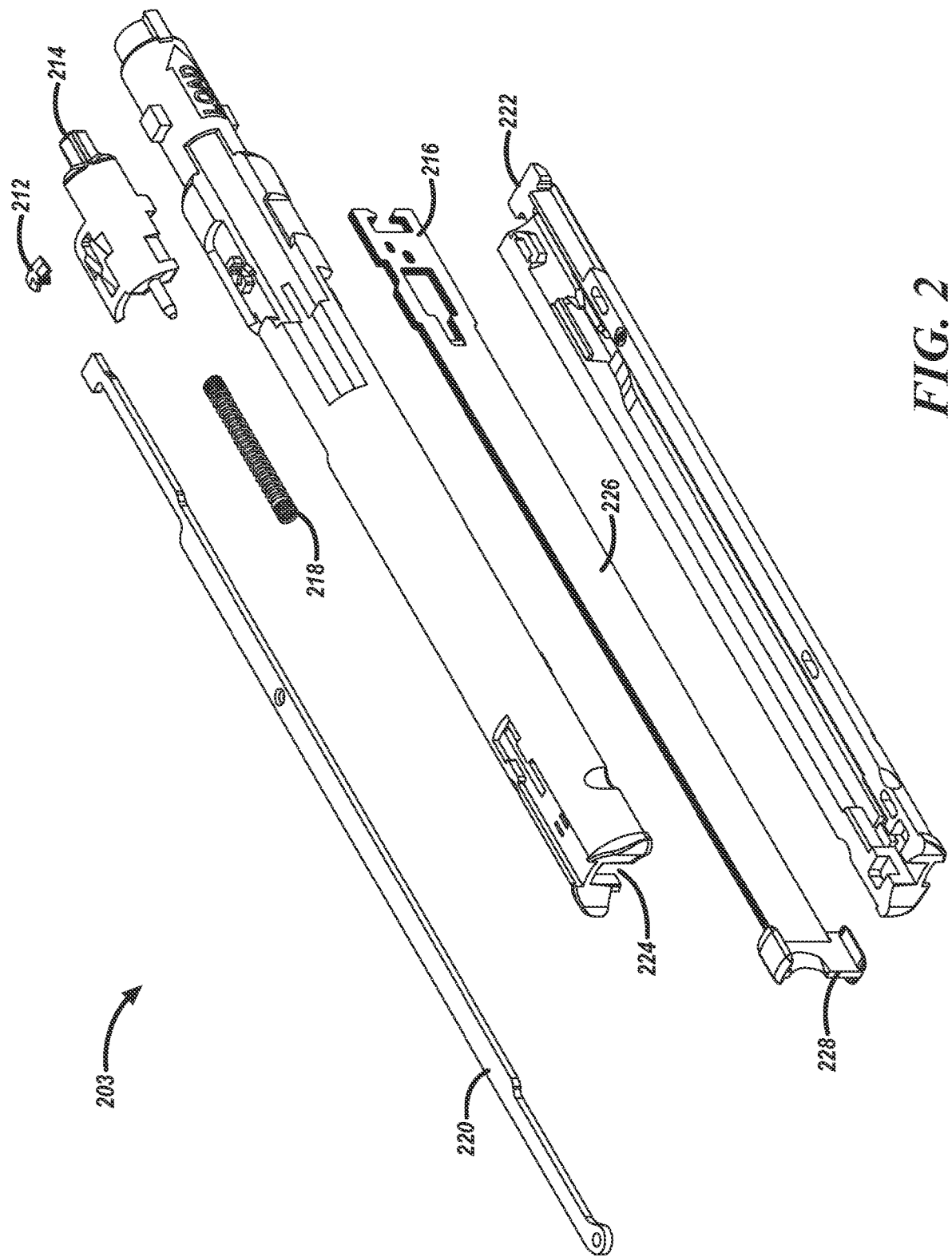
FIG. 2 is an exploded view schematic diagram of a surgical reloadable cartridge assembly in accordance with a number of embodiments of the present disclosure.

FIG. 2 is an exploded view schematic diagram of a surgical reloadable cartridge assembly 203 in accordance with a number of embodiments of the present disclosure. The surgical reloadable cartridge assembly 203 can include a blade lock 212, a lock slider 214, a spring 218, an articulation arm 220, a first portion of a cover 224, a second portion of the cover 222, and a blade assembly 216. Blade assembly 216 can include a number of leaves 226 and I-beam 228.

The lock slider 214 is configured to engage the blade lock 212 and actuate the blade lock 212 radially from the first position to the second position. The spring 218 can be configured to bias the lock slider 214 in a proximal direction so the lock slider 214 is engaged with the blade lock 212 and the blade lock 212 is in the first position. The first position, for example, can be a secure position that locks the blade assembly 216. The blade assembly 216 can be locked when the blade lock 212 is between the blade assembly 216 and the lock slider 214. The lock slider 214 can be configured to move proximally to engage the blade lock 212 and actuate the blade lock 212 from the second position to the first position. The blade lock 212 can actuate radially to the second position in response to the lock slider 214 moving in a distal direction when the assembly is coupled to a surgical handle assembly (e.g., surgical handle assembly 106 in FIG. 1). For example, the blade assembly 216 can be unlocked when the lock slider 214 is between the blade assembly 216 and the blade lock 212.

Figure 3:
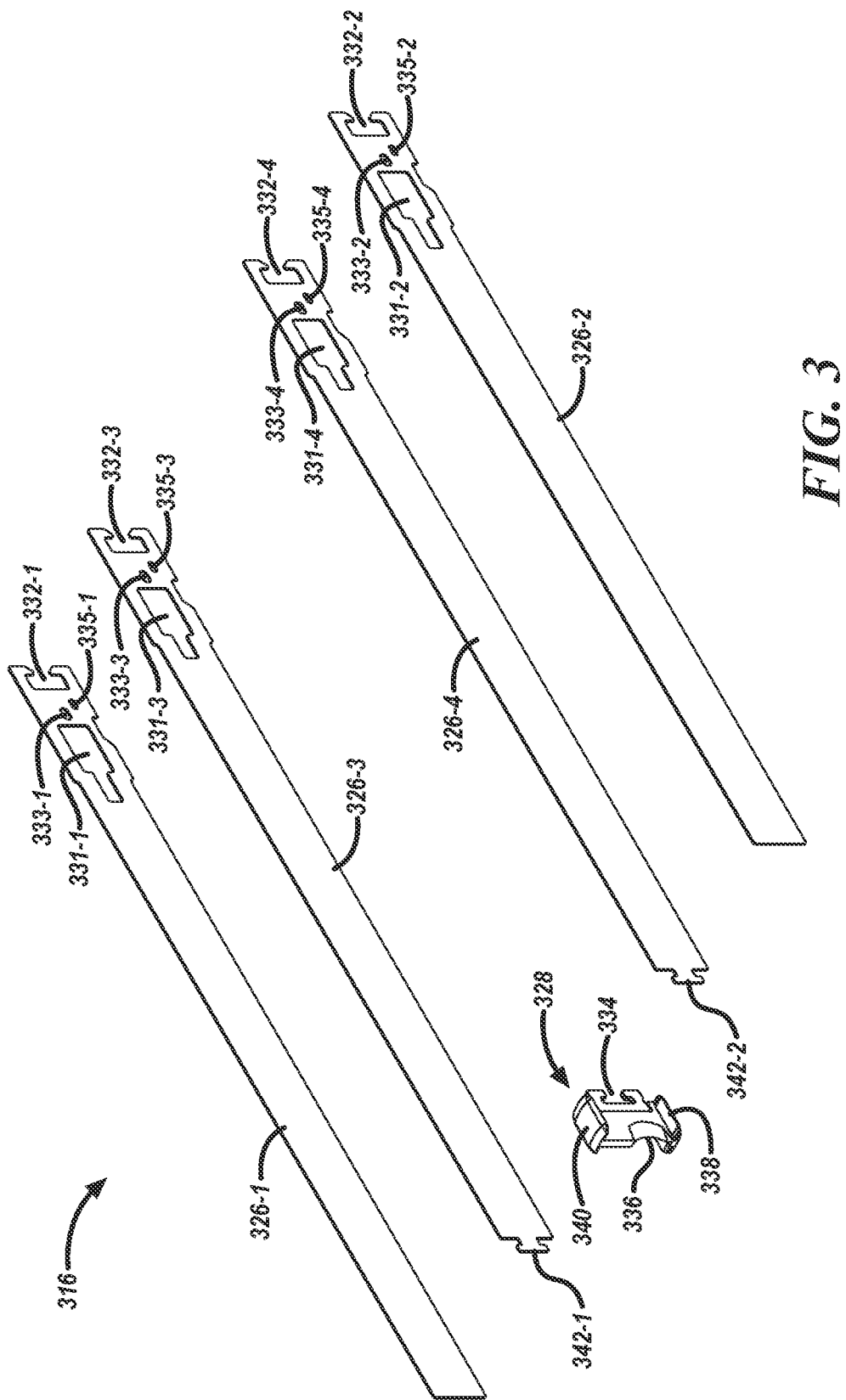
FIG. 3 is an exploded view schematic diagram of a blade assembly in accordance with a number of embodiments of the present disclosure.

FIG. 3 is an exploded view schematic diagram of a blade assembly 316 in accordance with a number of embodiments of the present disclosure. The blade assembly 316 includes a number of outer leaves 326-1 and 326-2, a number of inner leaves 326-3 and 326-4, and I-beam 328.

Each of the number of leaves 326-1, 326-2, 326-3, and 326-4 can include a number of openings including a first opening 331-1, 331-2, 331-3, and 331-4, a second opening 333-1, 333-2, 333-3, 333-4, and a third opening 335-1, 335-2, 335-3, and 335-4 to accommodate a lock out assembly. The lock out assembly can prevent staples from being fired more than one time.

Each of the number of leaves 326-1, 326-2, 326-3, and 326-4 can also include a slot 332-1, 332-2, 332-3, and 332-4 that is used to connect the blade assembly 316 to a drive shaft (e.g., drive shaft 109 in FIG. 1) of a drive mechanism of a surgical handle assembly (e.g., surgical handle assembly 106 in FIG. 1). The drive shaft can move distally or proximally in response to movement of the movable handle member (e.g., movable handle member 110 in FIG. 1). The distal end of inner leaves 326-3 and 326-4 can each include a capture feature 342-1 and 342-2. I-beam 328 can include cutting surface 336, top portion 340, bottom portion 338, and mechanical slot 334. When the blade assembly 316 is assembled, capture feature 342-1 and capture feature 342-2 are positioned within mechanical slot 334 to form a mechanical interlock.

The top portion 340 and/or the bottom portion 338 of I-beam 328 can interact with a first elongated member (e.g., elongated member 104 in FIG. 1) and/or a second elongated member (e.g., elongated member 105 in FIG. 1). When blade assembly 316 is moved distally by the drive shaft, the top portion 340 and/or the bottom portion 338 of I-beam 328 can cause the elongated members to move toward one another and/or to clamp. Further distal movement of blade assembly 316 when the elongated members are clamped can cause staples to be ejected from a staple cartridge and toward an anvil such that the staples are bent into the tissue holding configuration. Proximal movement of blade assembly 316 by the drive shaft can cause the elongated members to move away from one another and/or to unclamp.

Capture features 342-1 and/or 342-2 can be T shaped and mechanical slot 334 can have a complimentary T shape. Included within the scope of these inventions are capture features 342-1 and 342-2 and mechanical slots 334 of varying shape. The capture features 342-1 and 342-2 and the mechanical slot 334 may be of complimentary shapes such that the capture features 342-1 and 342-2 will fit within the mechanical slot 334 to form an interlock. The shape can be such that when tension is placed on the proximal end of an inner leaf 326-3 and 326-4, it will tension the I-beam 328 and will not be pulled out of the mechanical slot 334. In addition to T shapes, other shapes such as dove tails, stars, ovals, and circles can be used. For all shapes, the proximal end of the shape of the mechanical slot 334 can be open to allow the capture feature 342-1 and 342-2 to be positioned within the shaped opening of the mechanical slot 334.

In certain embodiments, a method of forming a blade assembly 316 is provided. An I-beam 328 with a shaped mechanical slot 334 and a number of notches (e.g., notches 544-1 and 544-2 in FIG. 5) is provided. At least one inner leaf 326-3 and 326-4 with a capture feature 342-1 and 342-2 shaped complimentarily to the mechanical slot 334 is positioned such that the capture feature 342-1 and 342-2 is positioned within the mechanical slot 334 of the I-beam 328. This connection allows the inner leaf 326-3 and 326-4 to move relative to the I-beam 328.

Two outer leaves 326-1 and 326-2 are then positioned along and outside of the at least one inner leaf 326-3 and 326-4 and are welded or secured to the I-beam 328. Once the outer leaves 326-1 and 326-2 have been secured to the I-beam 328, the at least one inner leaf 326-3 and 326-4 cannot be removed from the mechanical interlock. The inner leaf 326-3 and 326-4 may be able to be moved slightly such that the proximal end of the inner leaf 326-3 and 326-4 can be moved away from the longitudinal axis of the blade assembly 316.

The blade assembly 316 described herein will be more flexible than blade assemblies where all the leaves 326-1, . . . , 326-4 are attached directly to the I-beam 328 or where all leaves 326-1, . . . , 326-4 are attached to each other and/or to the I-beam 328. For example, a blade assembly 316 including two outer leaves 326-1 and 326-2 affixed to the I-beam 328 and an inner leaf 326-3 and 326-4 not affixed to either of the outer leaves 326-1 and 326-2 can be flexible. To further enhance the flexibility of the blade assembly, the leaves 326-1, . . . , 326-4 may have cutouts or openings therein.

Figure 4A:
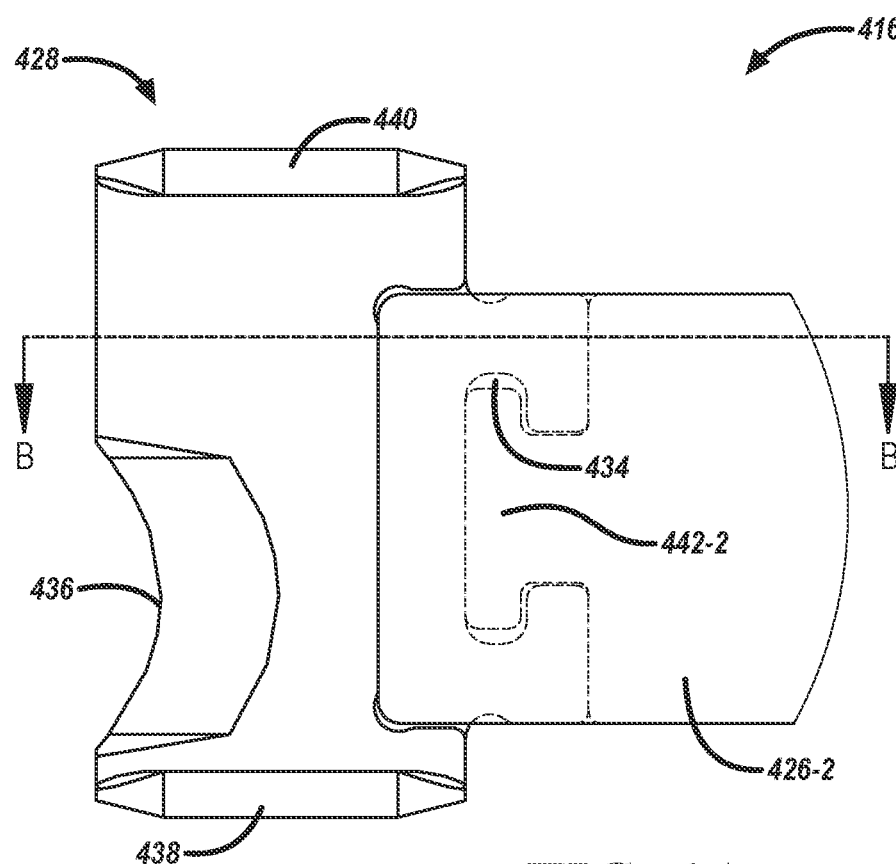
FIG. 4A is a schematic diagram of a distal end of a blade assembly in accordance with a number of embodiments of the present disclosure.
Figure 4B:
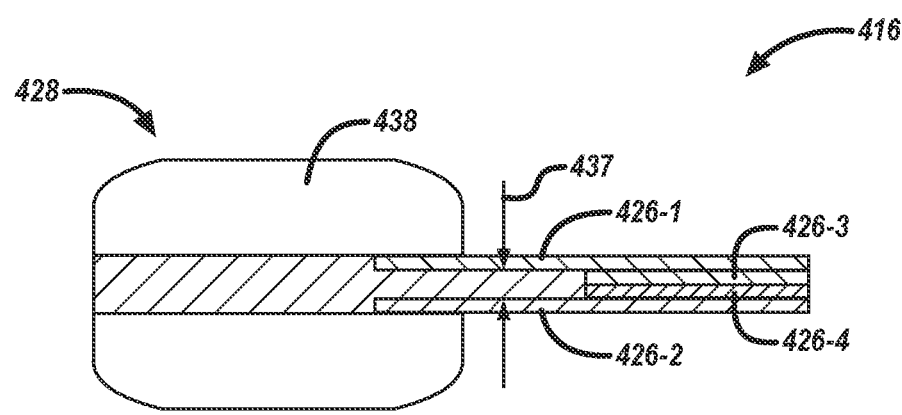
FIG. 4B is a schematic diagram of a cross section of a distal end of a blade assembly in accordance with a number of embodiments of the present disclosure.

FIGS. 4A and 4B are schematic diagrams of a distal end of blade assembly 416 in accordance with a number of embodiments of the present disclosure. In the embodiment shown in FIG. 4A, the distal end of the blade assembly 416 includes I-beam 428 including cutting surface 436, top portion 440, bottom portion 438 and as shown, leaf 426-2. Shown by the hidden (e.g., dashed) lines is mechanical slot 434 and the capture feature 442-2 of inner leaf 426-4.

FIG. 4B is a cross section view of FIG. 4A taken along line B-B. FIG. 4B shows the central body of I-beam 428 and the distal end of leaves 426-1, 426-2, 426-3 and 426-4. When the blade assembly 416 is assembled, capture feature 442-2 of inner leaf 426-4 is fitted in mechanical slot 434. The thickness 437 of mechanical slot 434 is approximately equal to or slightly larger than the thickness of the number of inner leaves 426-3 and 426-4.

The distal end of each of the outer leaves 426-1 and 426-2 fit within corresponding notches (e.g., notches 544-1 and 544-2 in FIGS. 5A and 5B) and can be welded or secured to I-beam 428. In some embodiments, the distal end of each outer leaf 426-1 and 426-2 is laser welded to I-beam 428 in its corresponding notch. In some embodiments each outer leaf 426-1 and 426-2 is also spot or laser welded to the body surrounding mechanical slot 434. The depth of the notches is selected so that the outer edge of the outer leaves 426-1 and 426-2 is approximately equal to the thickness of the middle portion (e.g., middle portion 539 in FIG. 5) of I-beam 428 when the blade assembly 416 is assembled.

Figure 5A:
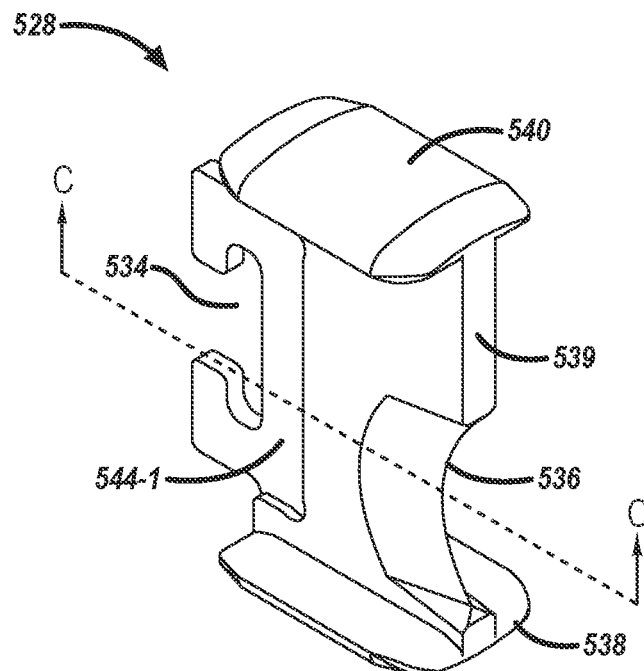
FIG. 5A is a schematic diagram of a perspective view of an I-Beam in accordance with a number of embodiments of the present disclosure.
Figure 5B:
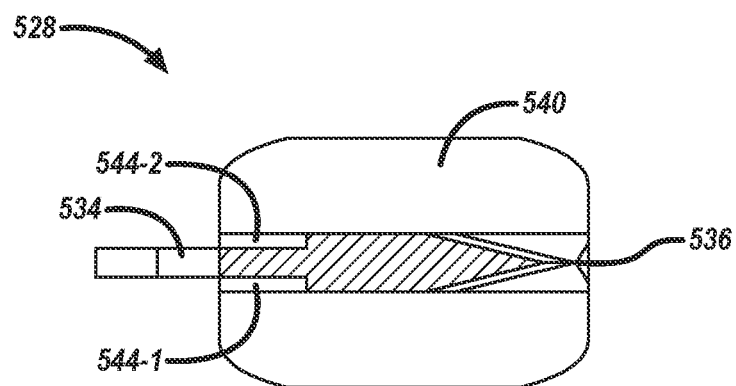
FIG. 5B is a schematic diagram of a cross section of an I-Beam in accordance with a number of embodiments of the present disclosure.

FIGS. 5A and 5B are schematic diagrams of an I-Beam 528 in accordance with a number of embodiments of the present disclosure. FIG. 5A illustrates an isometric view of I-beam 528 including a top portion 540, a bottom portion 538, a cutting surface 536, a mechanical slot 534, and a middle portion 539 including a notch 544-1.

FIG. 5B is a cross section of FIG. 5A taken along line C-C. FIG. 5B illustrates I-beam 528 including top portion 540, cutting surface 536, mechanical slot 534, and a middle portion 539 including notches 544-1 and 544-2.

In some embodiments, two notches 544-1 and 544-2 are provided on the I-beam 528 and outer leaf (e.g., outer leaf 426-1 in FIG. 4) is welded or secured within notch 544-1 and a different outer leaf (e.g., outer leaf 426-2 in FIG. 4) is welded or secured within notch 544-2. The assembled blade assembly can then be used in a surgical reloadable cartridge assembly (e.g., surgical reloadable cartridge assembly 103 in FIG. 1).

Some of the embodiments described herein have a surgical handle assembly with a reloadable staple or cartridge assembly. The embodiments herein are equally applicable to a staple system where the reloadable cartridge is just a staple cartridge that is loaded into one of the elongated members.

In many embodiments herein, the surgical handle assembly (e.g., surgical handle assembly 106 in FIG. 1) is shown as being manually actuated. Other handle assemblies such as ones that are driven by an electric motor may also be used. In these motor driven handle assemblies, a disposable or reusable/rechargeable battery may be used or the motor may be connected to some other power source. It is also envisioned that the handle assembly could be replaced by a robotic or remotely controlled mechanism. In this embodiment, the physician/user is remote from the patient and controls the device from a computer input station or the like. In this embodiment, the surgical reloadable cartridge assembly could be connected to a robotic or remotely controlled arm.

The terms proximal and distal, as used herein, are from the perspective of the clinician or other user of the device. The terms left and right, as used herein, are from the perspective of a clinician or other user holding the surgical handle assembly 106 in an upright position with movable handle member (e.g., movable handle member 110 in FIG. 1) on the bottom.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one.

Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A blade assembly, comprising:
   a plurality of leaves comprising two outer leaves and at least one inner leaf; and
   an I-beam comprising a mechanical slot,
   wherein:
      the at least one inner leaf comprises a shaped distal end that fits into the mechanical slot to connect the at least one inner leaf to the I-beam,
      a thickness of the mechanical slot is greater than a thickness of the at least one inner leaf,
      the two outer leaves are affixed to a body surrounding the mechanical slot of the I-beam to prevent the shaped distal end from being removed from the mechanical slot, and
      the at least one inner leaf is not affixed to either outer leaf and is not welded or otherwise fixedly secured to the I-beam such that the at least one inner leaf is movable relative to the I-beam.

2. The blade assembly of claim 1 wherein tension applied to a proximal end of the at least one inner leaf will provide tension to the I-beam, and wherein the shaped distal end of the at least one inner leaf cannot be pulled out of the mechanical slot of the I-beam in response to the tension.

3. The blade assembly of claim 2 wherein the at least one inner leaf comprises two inner leaves.

4. A surgical reloadable cartridge assembly, comprising:
   a shaft connected to two elongated members, the two elongated members being movable toward and away from each other; and
   a blade assembly positioned within the shaft, the blade assembly comprising:
      a plurality of leaves including
         two outer leaves; and
         at least one inner leaf having a shaped distal end, and
      an I-beam comprising a mechanical slot,
   wherein:
      the shaped distal end fits into the mechanical slot to connect the at least one inner leaf to the I-beam,
      the two outer leaves are affixed to a body surrounding the mechanical slot of the I-beam to prevent the shaped distal end from being removed from the mechanical slot,
      a thickness of the mechanical slot is equal to or greater than a thickness of the at least one inner leaf;
      the at least one inner leaf is not affixed to either outer leaf and is not welded or otherwise fixedly secured to the I-beam such that the at least one inner leaf is movable relative to the I-beam; and
      distal movement of the I-beam will cause the two elongated members to move toward one another.

5. The surgical reloadable cartridge assembly of claim 4 wherein one of the two elongated members comprise a staple cartridge and the other elongated member of the two elongated members comprises an anvil.

6. The surgical reloadable cartridge assembly of claim 4 wherein a proximal end of the I-beam comprises the mechanical slot.

7. The surgical reloadable cartridge assembly of claim 6 wherein the I-beam comprises a top portion, a bottom portion, a middle portion, the mechanical slot, and two notches included in the middle portion, and wherein a distal end of each outer leaf is affixed to the I-beam within a corresponding notch of the two notches.

8. The surgical reloadable cartridge assembly of claim 7 wherein a thickness of the middle portion of the I-beam is approximately equal to the thickness of the two outer leaves and the at least one inner leaf when the two outer leaves are attached to the I-beam.

9. The surgical reloadable cartridge assembly of claim 7 wherein each outer leaf is welded to the I-beam at (i) a first location in its corresponding notch and (ii) a second location positioned proximal the first location and about the mechanical slot.

10. The surgical reloadable cartridge assembly of claim 4 wherein the mechanical slot has a shape that is a T.

11. The surgical reloadable cartridge assembly of claim 4 wherein the at least one inner leaf is movable relative to the two outer leaves.

12. The surgical reloadable cartridge assembly of claim 4 wherein tension applied to a proximal end of the at least one inner leaf provides tension to the I-beam and wherein the shaped distal end of the at least one inner leaf cannot be pulled out of the mechanical slot in response to the tension.

13. The surgical reloadable cartridge assembly of claim 4 wherein the at least one inner leaf comprises two inner leaves.

14. The surgical reloadable cartridge assembly of claim 4 wherein the thickness of the mechanical slot is greater than the thickness of the at least one inner leaf.

15. The surgical reloadable cartridge assembly of claim 4 wherein the mechanical slot has a shape that is a dove tail.

16. A surgical stapling apparatus comprising:
   a surgical handle assembly comprising a movable handle member configured to move a drive shaft when the movable handle member is actuated; and
   a surgical reloadable cartridge assembly comprising:
      a shaft connected to two elongated members, the two elongated members being movable toward and away from each other, and
      a blade assembly positioned within the shaft, the blade assembly comprising:
         a plurality of leaves including:
            two outer leaves, and
            at least one inner leaf comprising a shaped distal end; and
         an I-beam comprising a mechanical slot,
      wherein:
         the shaped distal end fits into the mechanical slot to connect the at least one inner leaf to the I-beam while the at least one inner leaf remains movable relative to the I-beam,
         the two outer leaves are affixed to a body surrounding the mechanical slot of the I-beam to prevent the shaped distal end from being removed from the mechanical slot,
         a thickness of the mechanical slot is greater than a thickness of the at least one inner leaf,
         the at least one inner leaf is not affixed to either outer leaf, the drive shaft is connected to the blade assembly, and activation of the movable handle member results in distal movement of the I-beam and causes the two elongated members to move toward one another.

17. The surgical stapling apparatus of claim 16 wherein a proximal end of the I-beam comprises the mechanical slot.

18. The surgical stapling apparatus of claim 16 wherein the I-beam comprises a top portion, a bottom portion, a middle portion, the mechanical slot, and two notches included in the middle portion, wherein a distal end of each outer leaf is affixed to the I-beam within a corresponding notch of the two notches.

19. The surgical stapling apparatus of claim 16 wherein tension applied to a proximal end of the at least one inner leaf provides tension to the I-beam and wherein the shaped distal end cannot be pulled out of the mechanical slot in response to the tension.

20. The surgical stapling apparatus of claim 16 wherein the at least one inner leaf is movable relative to the two outer leaves.

21. The surgical stapling apparatus of claim 16 wherein the at least one inner leaf is not fixedly secured to the I-beam.

* * * * *